United States Patent [19]

Derbyshire

[11] Patent Number: 4,665,309

[45] Date of Patent: May 12, 1987

[54] SELF HEATING GASKET FOR HERMETICALLY SEALING A LID TO A BOX

[75] Inventor: Rodney L. Derbyshire, Menlo Park, Calif.

[73] Assignee: Metcal, Inc., Menlo Park, Calif.

[21] Appl. No.: 658,232

[22] Filed: Oct. 5, 1984

[51] Int. Cl.[4] ............................................. H05B 3/06
[52] U.S. Cl. .................................. 219/551; 219/538; 220/359
[58] Field of Search ..................................... 219/10-53, 219/85 R, 200, 233, 301, 528, 535, 536, 537, 541, 549, 551, 553, 504, 505; 156/69, 273.9, 275.1; 220/359, 378; 338/537, 541, 549

[56] References Cited

U.S. PATENT DOCUMENTS

| | | | |
|---|---|---|---|
| 1,369,919 | 3/1921 | Eliel | 219/85 R |
| 3,047,703 | 7/1962 | Aske | 156/273.9 |
| 3,218,384 | 11/1965 | Shaw | 338/214 |
| 4,117,589 | 10/1978 | Francis et al. | 338/276 |
| 4,147,927 | 4/1979 | Pirotte | 219/537 |
| 4,256,945 | 3/1981 | Carter et al. | 219/229 |
| 4,364,390 | 12/1982 | Shaw | 219/233 |
| 4,560,428 | 12/1985 | Sherrick et al. | 156/273.9 |

Primary Examiner—M. Jordan
Attorney, Agent, or Firm—Hall, Myers & Rose

[57] ABSTRACT

The lid is hermetically sealed to an associated box by a gasket in the form of a sealant covered temperature autoregulating heater.

7 Claims, 8 Drawing Figures

U.S. Patent  May 12, 1987  4,665,309
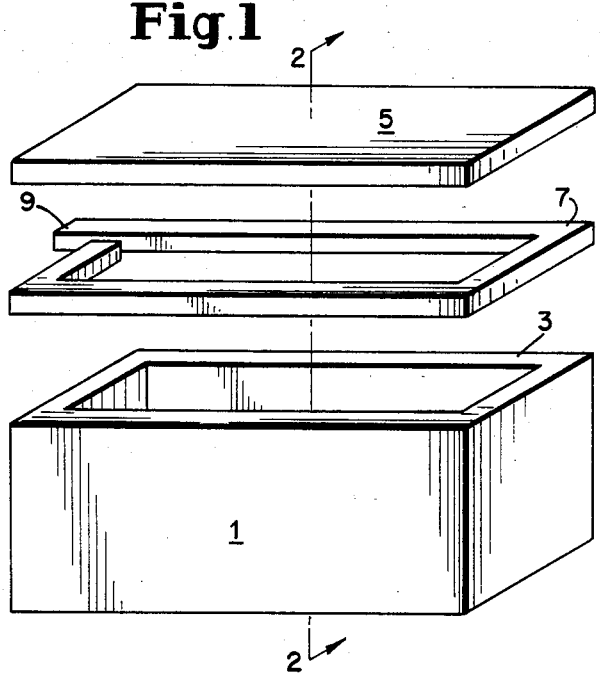
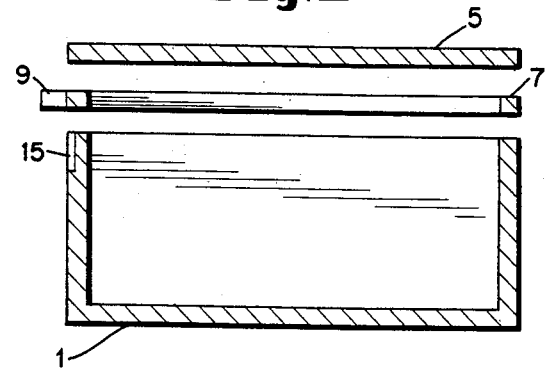
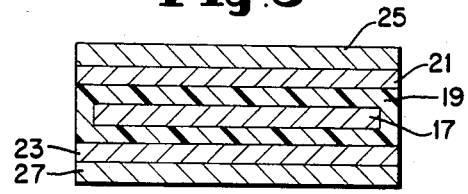
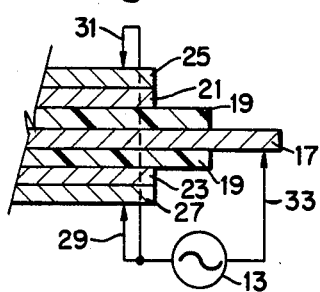
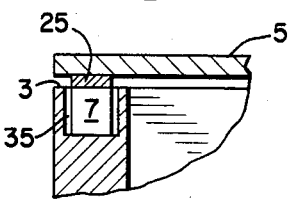
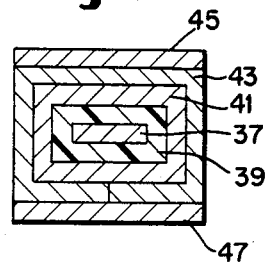
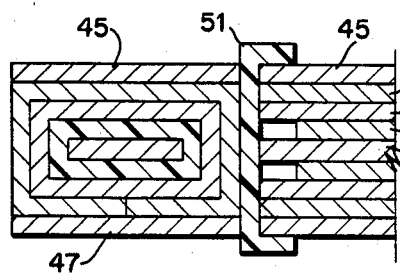
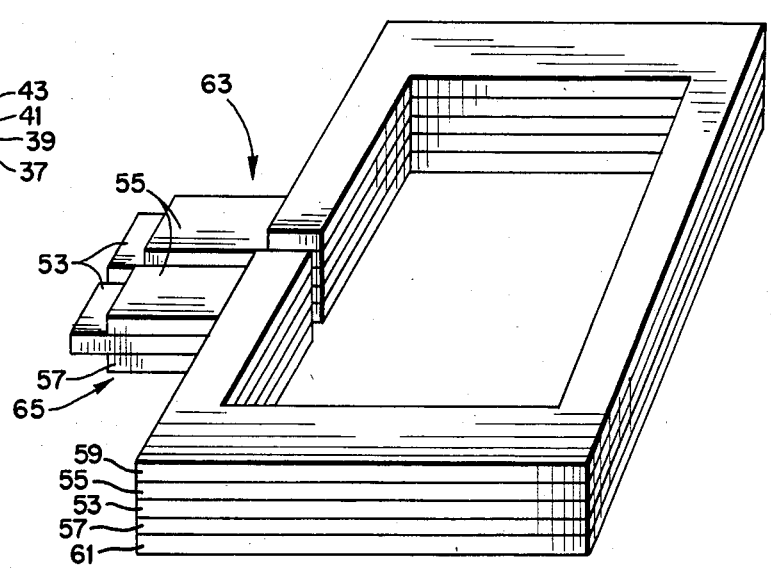

SELF HEATING GASKET FOR HERMETICALLY SEALING A LID TO A BOX

BACKGROUND OF THE INVENTION

The present invention relates to securing lids on boxes and more particularly to the use of a specific type of temperature autoregulating heater forming a gasket between the lid of a box and a box for heating a thermally activated sealant disposed between the gasket and each of the lid and the edges of the walls of the box.

The present invention is described as applied to a specific prior art problem but it should be recognized that the teachings relating to attaching lids, sidewalls, bottoms, etc. to a closure are universal in applicability and are described as applied to a particular problem as that problem led to the present invention.

The microwave segment of the electronic industry has grown very rapidly in recent years. The circuits themselves are typically located in small, hermetically sealed boxes. The boxes typically have one or more cavities full of circuitry and components, each of which has a lid. Lids are attached by means of welding, laser welding, soldering, etc.

Lid attachment and removal is a real cost and expense. No one method is preferred and all methods have drawbacks. The very high dollar value of these boxes leads to a need to reenter boxes for rework. Likewise, as many or most of these boxes are for military/aerospace end use, inspection leads to the need to reenter a box. Obviously, the need to machine off a lid to reenter as is often the case now, is a huge drawback to lid welding. Likewise, laser welding is both a high capital cost and high labor cost process.

Soldered lids have their drawbacks. A major drawback has been the flux/contaminant issue. More critical has been the inability to heat the lid contact area uniformly and all at the same time. Soldering irons obviously cannot do the job so that most lids are soldered on in ovens. This method has its own drawbacks, including a relatively long high temperature "soak" of the box and its components. Despite this, the relative ease of reentry makes soldered on lids desirable. Boxes are typically placed on a hot plate for reopening.

There are a large number of lid shapes and dimensions. There are also many different solders used, hence a wide range of soldering temperatures. Boxes are typically aluminum, plated with tin or gold. Lids are made of aluminum, Kovar, etc., and are also plated.

The present invention utilizes temperature autoregulating heaters which may be any one of the types disclosed in U.S. Pat. No. 4,256,945 to Carter et al, and U.S. patent application Ser. No. 586,712, filed Mar. 6, 1984, and Ser. No. 623,238, filed June 21, 1984, both assigned to the same assignee as the present invention. The disclosures of each of these are incorporated herein by reference.

The aforesaid U.S. Pat. No. 4,256,945 discloses an autoregulating heater comprising a layer of magnetic material coated on a conductive layer such as copper. A further or return conductor is disposed adjacent the magnetic layer and insulated therefrom except at an end of each where the two are connected together. The other ends of the return conductor and the magnetic material are connected across a constant current a.c. source, preferably though not necessarily a source in the range of 8 MHz to 20 MHz.

In operation, below the Curie point of the magnetic metal, the current due to skin effect and the proximity effect of electrical systems, is essentially confined to the magnetic material, i.e. the material adjacent the return conductor. As the temperature of the device approaches the Curie temperature and the permeability of the magnetic material approaches 1, the current spreads into the copper and the resistance of the heater is reduced. Since current is constant the joule heating is greatly reduced, and subsequently the magnetic material falls below its Curie temperature and the cycle repeats. Thus the heater is autoregulating.

Variations of some of the details of the basic design of the aforesaid heater are disclosed in the aforesaid U.S. application Ser. Nos. 586,712 and 623,238 and the two concurrently filed CIP applications and these designs may also be employed herein.

The concurrently filed application discloses a heater of the above type which is virtually massless and in which the equivalent of the return conductor and the insulation between the return conductor and the magnetic material may be removed.

RELATED APPLICATIONS

This application is related to co-pending application, Ser. No. 623,238, filed June 21, 1984 in the name of Rodney L. Derbyshire, and a concurrently filed CIP application thereof both of which are incorporated by reference. This application is also related to a concurrently filed application of Steve Purcell for Self Heating Lid for Soldering a Lid to a Box.

SUMMARY OF THE INVENTION

In accordance with the present invention a heater structure including at least the magnetic material of the prior art temperature autoregulating heater is employed as a gasket between a lid and its associated box; the gasket-heater when heated melting solder disposed on opposite sides of the gasket.

Specifically, the heater-gasket of the invention, comprises a center return conductor, a layer of insulation and at least a layer of magnetic material which must completely enclose the insulation to insure that no gases which may be evolved as a result of heating enter the box and damage the delicate circuit components.

The magnetic layer may be enclosed within a conductive material, such as copper and the opposed sides of the gasket may be covered with solder. The gasket forms a continuous layer between the lid and adjacent edges of the walls of the box.

The metal of the box may in some instances serve the same function as the copper outer layer to provide a low resistance current path above Curie temperature but in such an arrangement, as will hereinafter be explained, the edges of the magnetic layer are exposed and there may be a considerable lowering of effective permeability. This problem may be overcome by recessing the edges of the walls of the box to receive the gasket whereby only solder is exposed above the edge of the walls of the box.

In either configuration, attachment leads to the heater extend outwardly from the box so that the heater may at a later date be energized to permit removal of the lid.

In its broadest sense the present invention contemplates a temperature autoregulating heater in the form of a solder coated gasket for sealing a lid to a box, said sealant being solder in the case of metal or non-organic, glue in the case of non-metals; said gasket-heater autoregulating at a safe temperature for the components in the box.

BRIEF DESCRIPTION OF THE DRAWINGS

FIG. 1 is a disassembled view in perspective of a box, a heater-gasket and a lid in accordance with the present invention.

FIG. 2 is a cross-section view taken along Section line 2—2 of FIG. 1 but not showing the gasket in detail.

FIG. 3 is a detailed sectional view of one form of the gasket that may be employed in the assemblage of FIG. 1.

FIG. 4 is a partial sectional view detailing the terminal of the gasket.

FIG. 5 is a view in section of a modification of the box that may be employed with the gasket of FIG. 3.

FIG. 6 is a cross-sectional view of a preferred embodiment of the gasket of the present invention for use primarily with the box of FIG. 1.

FIG. 7 illustrates a mechanism for sealing the region between the leads to the gasket-heater, and FIG. 8 is a perspective view of a further embodiment of the present invention.

DESCRIPTION OF THE PREFERRED EMBODIMENT

Referring now specifically to FIGS. 1 and 2 of the accompanying drawings a box 1, has a surface 3 defining the upper edges as viewed in FIGS. 1 and 2, of the walls of the box to which a lid 5 is to be hermetically sealed. A gasket-heater 7 is disposed between the surface 3 and the opposed surface of the lid 5 and has a contact arrangement extending outwardly to the side for connection to a source of constant current.

When it is desired to solder the lid 5 to box 1, the gasket-heater is seated on the surface 3 of the box, the lid 5 is placed on top of the gasket 7, the gasket is connected via contact 9 to a constant current source 13. When the solder which is to be employed as a sealant in this instance is liquified and the lid and box are sufficiently heated to ensure against a cold solder joint, heating is discontinued and the contact, such as contact 9, is folded into a recess 15 in the side of the box, as viewed in FIG. 2 hereof. When it is desired to remove the lid, the contact is returned to the position illustrated in FIG. 1 and is connected again to a source 13.

Referring now to FIG. 3 of the accompanying drawing, one form of gasket according to the present invention is illustrated. A return conductor 17 of copper for instance, is surrounded by insulating material 19 which may be an inorganic insulation. Organic insulation might be contraindicated in this embodiment because of the evolution in the presence of heat of deleterious gases which will affect the components in the box. Layers of magnetic material 21 and 23 are disposed on opposite sides of the insulation and are covered on their exposed surfaces by layers of solder 25 and 27, respectively.

In operation the gasket of FIG. 3 is inserted between a box and its lid and heated on both surfaces due to the inclusion of magnetic materials on both sides of conductor 17. Current flows from layer 21 of contact 9, for instance, through both magnetic layers 21 and 23 and returns through conductor 17 back to contact 9; the layers 17, 21 and 23 all being interconnected at the end of the gasket remote from contact 9.

The autoregulation of the heater results from the combined function of skin effect and proximity effect. Skin effect causes current in an a.c. system to be confined adjacent the surface of a conductor adjacent the return conductor. The depth of the skin effect is determined by the equation $$S.D. \, .005030 \sqrt{\frac{\rho}{f\mu}}$$

where $\rho$ is conductivity of the magnetic material 21, 23 in microhm centimeters, $\mu$ is the effective relative permeability of the magnetic material and $f$ is the frequency in MHg. Using Alloy 42 as the magnetic material provides a mu of 200 to 400, a Curie temperature of about 220° C. and a resistivity of $75 \times 10^6$ ohm cm. With a frequency of 13.56 MHz, skin depth is 0.0008365 cm for a mu of 200. The thickness of layers 21 and 23 should be about 0.5 to 2 skin depths and thus approximate 0.0008 cm. In such case, approximately 60% of the current is confined to the magnetic material if the return conductor is located on the side of the layers remote from the adjacent conductor, such as layers 25 and 27. This fact is attributed to the proximity effect whereby the current is confined to the region of the magnetic layer adjacent the return conductor, in this application the layer 17 being considered the return conductor. Thus, all but approximately 13% of the current is confined to the relatively high impedance magnetic material and $I^2R$ heating is maximized.

When the heater approaches the Curie point of the magnetic material, its mu approaches 1 and skin depth is greatly reduced also due to the fact that the majority of the current spreads into the highly conductive adjacent layers 25 and 27 which may have a resistivity as low as copper; i.e. $2 \times 10^{-6}$ ohm-cm.

It should be noted that the solder layers may have been previously applied to the lid and the box so that layers 25 and 27 may be eliminated from the gasket without changing operation.

Referring specifically to FIG. 4 of the accompanying drawings, the terminal 9 is illustrated in detail. In the terminal region, layers 21, 23, 25 and 27 are terminated shortly before the end of the terminal to leave the insulation layers 19 exposed. The layer 19 terminates at a location between termination of the terminal and the other layers to leave the return conductor exposed. Thus, contact can readily be made to a source of current via contacts 29, 31 and 33.

Additional consideration must be given to the heater structure and in particular to the width to thickness ratio of the magnetic layer. If the magnetic layer is completely surrounded by a conductive layer then the intrinsic permeability of the magnetic material may be realized. If, however, the magnetic layer has exposed edges as in the present embodiment then the intrinsic permeability cannot be realized. The equation for the relationship between intrinsic and effective permeability for a rectangle is extremely complex but can be approximated by the following equation for an ovoid.

$$\mu_E = \mu_I \cdot \frac{1}{1 + \mu_I \left(\frac{t}{w + t}\right)}$$

where $\mu_E$ is effective permeability, $\mu_I$ is intrinsic permeability, t is thickness and w is width of the magnetic layer. The table below illustrates the effect of both permeability and the w/t ratio on the effective permeability.

| $\mu_I$ | 200 | 400 |
|---|---|---|
| w/t | | |
| 10 | 10 | 10 |
| 25 | 23 | 24 |
| 50 | 41 | 44 |
| 100 | 67 | 80 |
| 200 | 100 | 133 |
| 300 | 120 | 171 |
| 400 | 133 | 200 |
| 500 | 143 | 227 |
| 1000 | 167 | 286 |

Thus it is seen that the greater the ratio the higher the effective permeability and the lower the intrinsic permeability the higher the ratio of $\mu_E/\mu_I$. For instance, the ratio $\mu_E/\mu_I$ for w/t equal to 1000 is 0.835 for a permeability of 200 but is only 0.715 for a permeability of 400.

Two approaches may be employed to realize in the present invention, the intrinsic permeability of the magnetic material. One such approach is illustrated in FIG. 5 of the accompanying drawings. In this embodiment of the present invention, the upper surface 3 of the walls of the box 1 are recessed as at 35 and the gasket is seated in the recess. The upper solder layer 25 as viewed in FIG. 5, extends above the upper surface 3 of the walls of the box to insure good contact between the solder and the gasket. The width of the recess is slightly greater than that of the gasket so that excess solder has an overflow region.

In consequence of the fact that the magnetic layers are surrounded on three sides by the conductive material of the box and or by solder and on the top by the lid, the magnetic layers are wholly confined within conductive material and the deleterious effects of edge are effect are eliminated.

Another approach to solving the edge effect problem is to make the layers 21 and 23 of FIG. 3 continuous with one another and surround them with copper or the like all as illustrated in FIG. 6 of the accompanying drawing. A center return conductor 37 is surrounded by a layer 39 of insulation such as Kapton which in turn is surrounded by a layer 41 of magnetic material. A layer 43 of conductive material, such as copper, surrounds and is in electrical and thermal contact with layer 41 and its upper and lower surfaces may be coated with solder layers 45 and 47. Thus, the magnetic layer is a closed loop and is enclosed by conductive material to eliminate edge effects and permit realization of the full value of the intrinsic permeability of the magnetic material.

Relative to the magnetic materials, it should be noted that various nickel-iron alloys may be employed to predetermine the Curie temperature of the device. Other well known materials may also be used such as various Metglas TM amorphous alloys.

The gasket of the present invention is intended to hermetically seal the box 1 to its lid 5. In order to eliminate a physical gap between the two ends of the gasket, an electrical discontinutiy being essential to prevent a short circuit, the arrangment of FIG. 7 may be employed. A layer 51 of a thermosetting resin sealant is applied over the end 53 of the gasket remote from the terminal 9 and extends a quite short distance around the sides. This material when activated bonds to metal but is an insulator. Such a material may be an epoxy glue or the like. The end 53 of the gasket has the layers 37 and 43 connected together by removal of insulation 39 so that current can enter the return conductor 37. As previously set forth the layers of material in the gasket are extremely thin so that with the insulating layer 37 removed, the layers 37 and 41 are brought into contact when the outer copper sleeve 43 is folded about the structure during assembly.

The layer 51 of thermosetting resin 51 contacts both the side of the terminal 9 and the end 53 of the gasket so that when the resin is heat activated, the entire region is sealed.

Removal of the lid at a later date is only marginally affected since the resin contacts a quite small region of the box and lid and they may be readily severed.

The mode of the connection to a source helps define the thickness of the layer 43 in FIG. 6 and the thickness of the layers 25 and 27 in FIG. 3. The outer layer of solder will bridge the insulation 51 of FIG. 7. Thus current under cetain circumstances can flow through the solder layer at terminal 9 across the gap defined by insulating layer 51 directly to center conductor 37. No appreciable heating will occur. At the frequencies involved, however, the current below Curie temperature is confined to a region remote from the solder layer and no short circuit occurs.

The layers 25 and 27 of FIG. 3 and the layers 43 and 45 of FIG. 7 must be thick enough to insure that the same operation occurs above Curie temperature as below. To insure that the current is properly confined the layer thicknesses as defined in co-pending patent application Ser. No. 243,777, filed Mar. 16, 1984 in the names of Carter and Krumme and constituting a C.I.P. of the aforesaid patent, must be observed. For purposes of a complete exposition of this matter the disclosure of Ser. No. 243,777 is incorporated by reference, only the most pertinent parts being discussed herein. When Curie temperature is reached mu becomes 1 and resistivity becomes $2 \times 10^{-6}$ ohm cm (the resistivity of copper). Thus skin depth becomes 0.00193 cm. At five skin depths the current at the surface remote from the return conductor is 0.7% of total current and at ten skin depths is 0.0045%. Therefore if the outer conductive layer or layers are at least 0.0095 thick, short circuiting of the gasket is avoided.

Referring now specifically to FIG. 8 of the accompanying drawings, there is illustrated an embodiment of the invention utilizing induction coupling of current to the magnetic material rather than a conductive connection.

The gasket includes a center conductor 53, sandwiched between layers 55 and 57 of insulation. The layers 55 and 57 are in contact, respectively, with layers 59 and 61 of magnetic material.

The gasket is provided with terminals 63 and 65 for connection to a high frequency source. The magnetic layers 63 and 65 do not extend into the terminals and the insulation layers 55 and 57 are terminated short of the end of the terminals to expose the two ends of the conductor 53.

In operation, when current is applied across the two ends of conductor 53, current is induced in the magnetic material which experiences both skin effect, eddy current and hystereris losses. Upon achieving or closely approaching Curie temperature, the permeability of the magnetic layers approaches that of air or copper and the losses in the layers 59 and 61 are greatly reduced with the majority of the current flowing in the adjacent conductor of a copper layer or the adjacent metal of the box.

The gasket of FIG. 8 may take the form illustrated if recessed in the edge of the box illustrated in FIG. 5. Alternatively, the gasket may take the form of the gasket of FIG. 6.

The term "constant current" as employed herein does not mean a current that cannot increase, but means a current that obeys the following formula $$\frac{\Delta |I|}{|I|} > -\tfrac{1}{2} \frac{\Delta R}{R}$$

where I is the load current. Specifically, in order to autoregulate, the power delivered to the load when the heater exceeds Curie temperature, must be less than the power delivered to the load below Curie temperature. If the current is held invariable, then the best autoregulating ratio is achieved short of controlling the power supply to reduce current. So long, however, that the current is controlled in accordance with the above formula, autoregulation is achieved. Thus, when large autoregulating ratii are not required, constraints on the degree of current control may be relaxed thus reducing the cost of the power supply.

The above equation is derived by analyzing the equation:

$$P = |I^2 R|$$

where P is power and I is the current in the load. Differentiating with respect to R $$\frac{dP}{dR} = |I|^2 + 2R|I|\frac{dI}{dR}$$

to satisfy the requirements for autoregulation P/dR > 0 Thus, $$|I^2| + 2R|I|\frac{d|I|}{dR} > 0,$$

which reduces to the above equation. It should be noted, however, that the more constant the current the better the autoregulation.

Once given the above disclosure, many other features, modifications and improvements will become apparent to the skilled artisan. Such other modifications, features and improvements are, therefore, considered a part of this invention, the scope of which is to be determined by the following claims.

I claim:

1. A gasket for hermetically sealing a lid to a box without evolving deleterious gases and permitting subsequent removal and reapplication of the lid, said gasket comprising
   a temperature autoregulating heater having a configuration of the entire contacting surfaces of the lid and the box, and
   means adapted to connect said heater to a source of alternating current.

2. The gasket according to claim 1 further comprising
   a layer of heat activated sealant disposed on the areas of said gasket that are intended to contact areas of the lid and the box.

3. The gasket according to claim 1 or claim 2 further comprising
   a terminal for connection to a source of current at one end only of said gasket,
   said terminal extending outwardly from the perimeter of said box.

4. The gasket according to claim 3 wherein
   said gasket has its two ends abutting adjacent said terminal and
   means for electrically insulating said ends from one another in the region of said abutment.

5. A sealed container comprising
   a container having a plurality of walls with end surfaces, having inner and outer edges,
   a lid covering said end surfaces and the interior space defined by said walls, and
   a gasket lying between said end surfaces and said lid and having an outer periphery substantially defined by the outer edges of said end walls,
   said gasket being an autoregulating heater.

6. A sealed container according to claim 5 further including
   a sealant disposed between and in contact with said end surfaces and said gasket and between said gasket and said lid.

7. A sealed container according to claim 5 wherein said gasket is a narrow strip having the width of said end surfaces and the length and configuration of the end surfaces.

* * * * *